United States Patent
Huang et al.

(10) Patent No.: US 12,397,416 B2
(45) Date of Patent: Aug. 26, 2025

(54) ROBOT CONTROL METHOD, STORAGE MEDIUM AND ELECTRONIC DEVICE

(71) Applicant: CloudMinds Robotics Co., Ltd., Shanghai (CN)

(72) Inventors: Xiao-Qing William Huang, Shanghai (CN); ZhanChao Zhang, Shanghai (CN); Shikui Ma, Shanghai (CN); Bin Wang, Shanghai (CN); Guanghua Yang, Shanghai (CN)

(73) Assignee: CloudMinds Robotics Co., Ltd., Shanghai (CN)

( * ) Notice: Subject to any disclaimer, the term of this patent is extended or adjusted under 35 U.S.C. 154(b) by 603 days.

(21) Appl. No.: 17/565,889

(22) Filed: Dec. 30, 2021

(65) Prior Publication Data

US 2022/0331953 A1    Oct. 20, 2022

Related U.S. Application Data

(63) Continuation of application No. PCT/CN2021/103292, filed on Jun. 29, 2021.

(30) Foreign Application Priority Data

Apr. 14, 2021   (CN) .......................... 202110401397.5

(51) Int. Cl.
     *B25J 9/16*   (2006.01)
(52) U.S. Cl.
     CPC ..................................... *B25J 9/163* (2013.01)
(58) Field of Classification Search
     CPC ................. B25J 9/163; B25J 9/1679; G05B 2219/40202; G05B 2219/40411
     See application file for complete search history.

(56) References Cited

U.S. PATENT DOCUMENTS

| 2012/0136481 A1* | 5/2012 | Maisonnier | ............ B25J 9/1671 |
| | | | 700/257 |
| 2016/0059412 A1* | 3/2016 | Oleynik | ................... B25J 19/02 |
| | | | 700/250 |

(Continued)

FOREIGN PATENT DOCUMENTS

| CN | 110147986 A | 8/2019 |
| CN | 110297697 A | 10/2019 |

(Continued)

OTHER PUBLICATIONS

Notice of Reasons for Refusal issued by the Japan Patent Office for Japanese Patent Application No. JP2021-578155, dated Jul. 4, 2023, with an English translation.

(Continued)

*Primary Examiner* — Wade Miles
*Assistant Examiner* — Mohammed Yousef Abuelhawa
(74) *Attorney, Agent, or Firm* — MYERS WOLIN, LLC

(57) ABSTRACT

A robot control method includes: the first control instruction of the robot is obtained; the behavior blueprint corresponding to the first control instruction is determined, the behavior blueprint including the plurality of blueprint nodes connected according to the target sequence; and the preset functions corresponding to the blueprint nodes are executed according to the target sequence. The preset functions corresponding to the blueprint nodes may include the atomic API ability, the meta skill and the task skill. The atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or more components.

15 Claims, 8 Drawing Sheets

(56) References Cited

U.S. PATENT DOCUMENTS

| | | | | |
|---|---|---|---|---|
| 2019/0291277 A1* | 9/2019 | Oleynik | ................ | B25J 9/1669 |
| 2020/0230817 A1* | 7/2020 | Han | ...................... | B25J 9/1661 |
| 2021/0237266 A1* | 8/2021 | Kalashnikov | .......... | B25J 9/1612 |

FOREIGN PATENT DOCUMENTS

| | | |
|---|---|---|
| CN | 110825121 A | 2/2020 |
| CN | 110825368 A | 2/2020 |
| CN | 111267086 A | 6/2020 |
| CN | 111452042 A | 7/2020 |
| CN | 111552238 A | 8/2020 |
| KR | 20180063391 A | 6/2018 |
| WO | 2020/075419 A1 | 4/2020 |

OTHER PUBLICATIONS

First Office Action issued by China National Intellectual Property Administration for corresponding Chinese application No. 202110401397.5 dated Mar. 9, 2022, with full English translation.
International Search Report of the International Searching Authority issued by China National Intellectual Property Administration for corresponding International Patent Application No. PCT/CN2021/103292, mailed on Jan. 13, 2022, with a full English translation.

* cited by examiner

| | | | | | | |
|---|---|---|---|---|---|---|
| Scenario role-oriented value skills | Welcoming robot-doorway welcoming skill | Family nanny robot-cooking skill | Security robot - automatically patrolling skill | Delivery robot-indoor object delivery skill | Table tennis training partner robot-serving skill | ... |
| Behavior skills | Doorway welcoming skill | Guiding skill | Beverage offering skill | Dancing skill | Cooking skill | Cleaning skill | Serving skill | ... |
| | Automatically patrolling skill | | Indoor object delivery skill | | Cell object delivery skill | | Catching skill | |
| Action skills | Chatting | Business conversation | Recognize user's intension | Shake hands and extend greetings | Hug with both hands | ... |
| Meta Skills | Automatic speech synthesis broadcast | Question-and-answer dialogue | Reach out a hand | Face recognition | ... |
| | Automatic speech recognition | Automatically return to be charged | Automtically avoid obstacles | Grasp | |
| | Natural language understanding | Hold up with one hand/both hands | Push with one hand/both hands | | |
| Atomic API abilities | Sensor detection ability | Sensor data analysis ability | Route planning ability | Sensor control ability | Joint element control ability | Robot chassis control ability | ... |
| | Light control ability | | Loudspeaker control ability | | | |

Fig. 2

ROBOT CONTROL METHOD, STORAGE MEDIUM AND ELECTRONIC DEVICE

CROSS REFERENCE TO RELATED APPLICATION

The present application is a continuation application of international application PCT/CN2021/103292 filed on Jun. 29, 2021, which claims foreign priority to Chinese Patent Application No. 202110401397.5 filed on Apr. 14, 2021, and designated the U.S., the entire contents of which are incorporated herein by reference.

BACKGROUND

With continuous development and progress of the robot technology, users have more and more differentiated customization demands for robots. A task executed by a robot is to control a robot actuator according to an operation instruction program of the robot to complete a preset function and task. In the related art, the operation instruction program of the robot is realized through code programming, which can only be set and modified by professionals, resulting in that a user cannot modify the operation instruction program of the robot to meet the customization demands of the user.

SUMMARY

In a first aspect of the disclosure provides a robot control method. The method includes:
  obtaining a first control instruction of a robot;
  determining a behavior blueprint corresponding to the first control instruction, the behavior blueprint including a plurality of blueprint nodes connected according to a target sequence; and
  executing preset functions corresponding to the blueprint nodes according to the target sequence.
  The preset functions corresponding to the blueprint nodes include an atomic API ability, a meta skill and a task skill. The atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components.

In a second aspect, the disclosure provides a non-transitory computer readable storage medium, storing a computer program thereupon. When the computer program in the storage medium is executed by a processor, the processor is caused to:
  obtain a first control instruction of a robot;
  determine a behavior blueprint corresponding to the first control instruction, the behavior blueprint includes a plurality of blueprint nodes connected according to a target sequence; and
  execute preset functions corresponding to the blueprint nodes according to the target sequence;
  the preset functions corresponding to the blueprint nodes include an atomic API ability, a meta skill and a task skill, the atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components.

In a third aspect, the disclosure provides an electronic device, including: a memory, storing a computer program thereupon; and a processor, configured to execute the computer program in the memory so as to:
  obtain a first control instruction of a robot;
  determine a behavior blueprint corresponding to the first control instruction, the behavior blueprint includes a plurality of blueprint nodes connected according to a target sequence; and
  execute preset functions corresponding to the blueprint nodes according to the target sequence;
  the preset functions corresponding to the blueprint nodes include an atomic API ability, a meta skill and a task skill, the atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components.

Other features and advantages of the disclosure will be described in detail in the subsequent detailed description part.

BRIEF DESCRIPTION OF THE DRAWINGS

The accompanying drawings are used to provide a further understanding of the disclosure, and constitute a part of the specification. Together with the following specific implementations, they are used to explain the disclosure, but do not constitute a limitation to the disclosure. In the accompanying drawings:

FIG. 2 is a schematic diagram of preset functions of a robot provided by an example of the disclosure;

DETAILED DESCRIPTION

Figure 1:
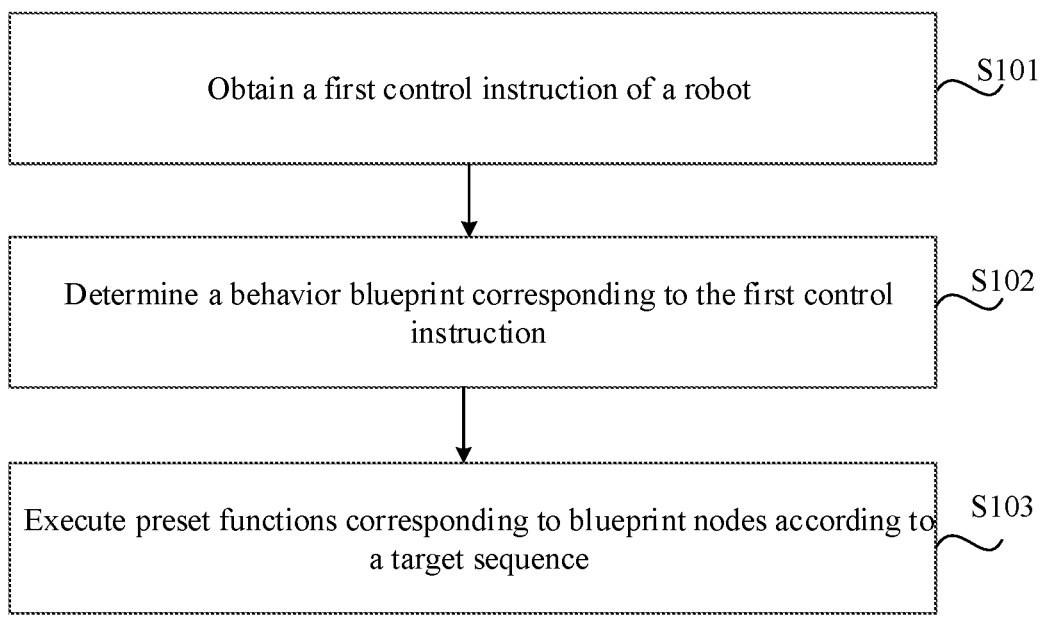
FIG. 1 is a flow chart of a robot control method provided by an example of the disclosure.

Specific implementations of the disclosure will be described in detail below with reference to the accompanying drawings. It should be understood that the specific implementations described herein are only used to illustrate and explain the disclosure, and are not used to limit the disclosure.

In the following description, words such as "first" and "second" are only used for the purpose of distinguishing description, and cannot be understood as indicating or implying relative importance, nor as indicating or implying order.

First, application scenarios of the disclosure will be described. The disclosure can be applied to robot control scenarios, especially service robot control scenarios. A service robot is a kind of semi-autonomously or fully-autonomously working robot and can complete service work that is beneficial to human health and life. As service-oriented robots are more and more widely used, how to enable the robots to help people complete different services in different application scenarios will become more and more valuable. However, the same type of robots produced by a robot manufacturer have the same operating instruction program upon production, but even for the same type of robots, different users have different demands. For example, the same type of household cleaning service robots needs to realize different functions and tasks in different users' homes. Some users want a robot to complete sweeping tasks, some users want the robot to complete sweeping and window cleaning tasks, and some users want the robot to complete sweeping and welcoming tasks. In order to achieve different functions, it is necessary to modify the robot's operation instruction program according to customers' differentiated customization demands. In the related art, the robot's operation instruction program is realized through code programming. Generally, it can only be set and modified by professionals of the robot manufacturer. As a result, the users cannot modify the robot's operation instruction program in a timely and convenient manner to meet their own customization demands.

In order to solve the above problems, the disclosure provides a robot control method, a storage medium and an electronic device. The method includes: the first control instruction of the robot is obtained; the behavior blueprint corresponding to the first control instruction is determined, the behavior blueprint including the plurality of blueprint nodes connected according to the target sequence; and the preset functions corresponding to the blueprint nodes are executed according to the target sequence. The preset functions corresponding to the blueprint nodes may include the atomic API ability, the meta skill and the task skill. The atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components. In this way, the user can construct the behavior blueprint of the robot conveniently according to different service scenarios and demands, so that the robot completes the first control instruction of the user according to the constructed behavior blueprint to meet differential customization demands of different users.

The specific implementations of the disclosure will be described in detail in combination with the accompanying drawings.

FIG. 1 is a robot control method provided by an example of the disclosure. As shown in FIG. 1, the method includes:

S101, a first control instruction of a robot is obtained.

The first control instruction may be used for indicating the robot to execute a target task. In the step, the first control instruction may be obtained through any one of the following two manners.

Manner 1, a user control instruction input by a user is obtained as the first control instruction.

The user control instruction may include a voice control instruction or a gesture control instruction given by the user to the robot, and may also include a control instruction given by the user to the robot through a robot control device.

Manner 2, the robot generates the first control instruction according to sensor data detected by its sensor.

The sensor data may include environment data of the robot, and a controller of the robot generates the first control instruction according to the environment data.

For example, a welcoming robot may generate a first control instruction for executing a welcoming task in a case of detecting a human face at a doorway through the sensor.

S102, a behavior blueprint corresponding to the first control instruction is determined.

The behavior blueprint includes a plurality of blueprint nodes connected according to a target sequence.

It needs to be noted that, in the example of the disclosure, the behavior blueprint may serve as an operation instruction program of the robot, and the robot is controlled to execute relevant actions or tasks through one or a plurality of blueprint nodes in the behavior blueprint. For example, an executing main body in the example may be a robot control platform based on an unreal engine. In the unreal engine, one or a plurality of preset functions may be combined to generate a blueprint node, and the plurality of blueprint nodes are connected according to the target sequence to obtain the behavior blueprint. Through the behavior blueprint, a target task indicated by the first control instruction may be realized.

S103, the preset functions corresponding to the blueprint nodes are executed according to the target sequence.

It needs to be noted that, the robot may include one or a plurality of execution units, and each execution unit include one or a plurality of components. For example, each execution unit may be a modular component, such as different kinds of sensors, a joint actuator, light, a loudspeaker, etc.

The preset functions corresponding to the blueprint nodes may include one or more of an atomic API (application programming interface) ability, a meta skill and a task skill. The three kinds of preset functions are respectively described below.

I. The atomic API ability may be used for characterizing a specific function executed by the robot through a component, i.e. realizing an API-level ability of an application program of the robot, corresponding to variants or functions constituting the behavior blueprint of the robot.

The atomic API ability may include one or more of a sensor detection ability, a sensor data analysis ability, a component control ability, and a route planning ability.

The sensor detection ability may include an ability of detecting through a sensor of the robot and obtaining original sensor data, for example: image detection, sound detection and position detection.

The sensor data analysis ability may include an ability of analyzing the original sensor data and obtaining perception data, for example: face detection analyzing original image data obtained through image detection, target detection, object classification, instance segmentation or natural voice understanding, which obtains image perception data; voice recognition analyzing original sound data obtained through sound detection, which obtains voice perception data; and laser positioning and/or visual positioning analyzing position detection data, which obtains position perception data.

The component control ability may include one or more of a sensor control ability, a joint element control ability, a robot chassis control ability, a light control ability and a loudspeaker control ability.

The route planning ability includes an ability of planning a moving route of a robot body or a joint actuator from a current position to a target position. The moving route includes a planar two-dimensional route and a spatial three-dimensional route.

It needs to be noted that, the robot has various kinds of atomic API abilities, which are not limited to the instances listed above. The atomic API abilities may be realized through code programming. For example: API-level abilities for realizing application programs of the robot may all serve as atomic API abilities, and the atomic API abilities may also be variants of functions in the behavior blueprint of the robot.

II. The meta skill may be used for characterizing a function of an execution unit of the robot. The execution unit may be a modular component, or may be a combination of a plurality of components. For example, the execution unit may include: a laser radar, a 3D vision camera, an obstacle avoiding camera, an ultrasonic sensor, a drop sensor, a collision sensor, a joint actuator, light, a loudspeaker, etc. The robot's meta skills may include one or more of the following functions: face recognition, question-and-answer dialogue, automatic speech recognition, natural language understanding, and automatic speech synthesis broadcast, and further include motion-related functions: reaching out a hand, grasping, holding up with one hand/both hands, pushing with one hand/both hands, automatically returning to be charged, automatically avoiding obstacles and other atomic actions that have similar meanings like human actions.

Each meta skill may be formed by logical combination of one or more atomic API capabilities, or may be formed by code programming.

III. The task skill may be used for characterizing a function of user-oriented execution of a target task by the robot. The task skill may be a function of being able to execute or complete a specific human-like action, or may be a function of providing the user with a complete service.

The task skill may be formed by logical combination of one or more meta skills; may be formed by logical combination of meta skills and atomic API abilities; or of course, may be formed by code programming.

It needs to be noted that, the above user is used for characterizing a human who can enjoy the robot's services. For example, if the robot is a home service robot, every family member and every visitor to the family may be the user. If the robot is a shop service robot, every staff member and every customer entering a shop may be the user.

By adopting the above method, the first control instruction of the robot is obtained; the behavior blueprint corresponding to the first control instruction is determined, the behavior blueprint including the plurality of blueprint nodes connected according to the target sequence; and the preset functions corresponding to the blueprint nodes are executed according to the target sequence. The preset functions corresponding to the blueprint nodes may include the atomic API ability, the meta skill and the task skill. The atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components. In this way, the user can construct the behavior blueprint of the robot conveniently according to different service scenarios and demands, so that the robot completes the first control instruction of the user according to the constructed behavior blueprint to meet differential customization demands of different users. The user can construct the behavior blueprint of the robot conveniently according to different service scenarios and demands, so that the robot completes the first control instruction of the user according to the constructed behavior blueprint to meet differential customization demands of different users.

In some other examples of the disclosure, the task skill includes action skills and behavior skills.

The action skills may be used for characterizing functions interaction or feedback between the robot and the user. Each action skill may be formed by logical combination of one or more meta skills, may also be formed by logical combination of meta skills and atomic API abilities, and can execute or complete a specific human-like action. For example, the action skills may include: the robot chatting with human, making business conversations, recognizing the user's intensions, shaking hands and extending greetings, hugging with both hands, standing upright and saluting, etc.

The behavior skills may be used for characterizing functions of the robot providing services for the user. Each behavior skill may be formed by logical combination of one or more meta skills, or may be formed by logical combination of one or more of action skills, meta skills and atomic API skills. For example, the behavior skills may include a guiding skill, a beverage offering skill, a dancing skill, a cooking skill, a cleaning skill, etc.

Further, in order to enable the user to more clearly construct the behavior blueprint of the robot by himself/herself, the above preset functions may be strictly hierarchically divided: each above behavior skill may include one or more of the above action skills; each above action skill may include one or more of the above meta skills; and each above meta skill may include one or more of the above atomic API abilities.

In this way, the user can construct the blueprint nodes in a more convenient and clear mode through the four levels of preset functions, and further construct the behavior blueprint through one or a plurality of blueprint nodes.

Optionally, the preset functions corresponding to executing the blueprint nodes may all be parsed into the atomic API abilities and may be executed through the atomic API abilities. In this way, as long as complete atomic API abilities of the robot are constructed upon production, the user may combine according to the atomic API abilities to obtain different blueprint nodes, and further construct the behavior blueprint through one or a plurality of blueprint nodes to complete a specific task in a specific scenario.

FIG. 2 is a schematic diagram of preset functions of a robot provided by an example of the disclosure. As shown in FIG. 2, the preset functions may include the above atomic API abilities, meta skills, action skills and behavior skills. Optionally, the preset functions may further include scenario role-oriented value skills. The value skills may be used for characterizing role-specific or adept skills of a role robot, and the value skills may be one or more of the behavior skills of the robot. For example: a family nanny robot's value skills may include cooking skills and cleaning skills; a security robot's value skills may include an automatically patrolling skill; a delivery robot's value skills may include indoor object delivery and community object delivery; and a table tennis training partner robot's value skills may include a serving skill. The above value skills may be obtained through training the robots, and are respectively the best skills of the robots.

In this way, through the above scenario role-oriented value skills, different robots can be distinguished, so the user may select a proper robot to complete a corresponding service task.

The above preset functions will be explained by taking a welcoming robot as an instance. The welcoming robot may provide welcoming services in a welcoming scenario. The welcoming robot's welcoming scenario-oriented value skills may include a doorway welcoming skill and a guiding skill, and the welcoming robot's behavior skills may include the doorway welcoming skill, the guiding skill and the beverage offering skill.

In particular, the doorway welcoming skill may include the following action skills: face recognition, shaking hands and extending greetings, and chatting and conversation; and the guiding skill may include the following action skills: route guidance and seat guidance; and the beverage offering skill may include the following action skills: beverage need inquiry, beverage opening, and beverage delivery.

Further, the action skill "face recognition" may include one meta skill "face recognition"; the action skill "shaking hands and extending greetings" may include the following meta skills: reaching out a right hand, grasping a target object, and broadcasting a greeting sentence "greetings, welcome"; and the action skill "seat guidance" may include the following meta skills: recognizing a target position, planning a target route, reaching out a right hand to guide the target route, and broadcasting a route guiding sentence "this way, please."

The meta skill "face recognition" may include the following atomic API abilities: image collection, face image feature extraction and face matching recognition. In particular, "image collection" may obtain image data of a face through controlling a 3D vision camera of the robot to perform image detection; "face image feature extraction" may recognize and analyze the face through the image data to obtain face image features; and "face matching recognition" may compare the face image features with image features of preset face images stored in the robot to determine whether a face recognition result is a guest or not. If a preset face image is a shop staff member, in a case that a matching degree between detected face image features and image features of a certain preset face image is larger than or equal to a matching threshold, the face recognition result may be determined as a staff member and not a guest; and on the contrary, in a case that the matching degree between the detected face image features and image features of all preset face images is smaller than the matching threshold, the face recognition result may be determined as a guest.

Further, the welcoming robot may include a first behavior blueprint, and the first behavior blueprint may include three blueprint nodes AB/C. A preset function corresponding to the blueprint node A is the doorway welcoming skill, a preset function corresponding to the blueprint node B is the guiding skill, and a preset function corresponding to the blueprint node C is the beverage offering skill. A target sequence of the first behavior blueprint is the blueprint node A→the blueprint node B→the blueprint node C. In this way, by executing the sequence of the three blueprint nodes, three service tasks of doorway welcoming, seat guidance and beverage offering in a series are completed.

The welcoming robot may also include a second behavior blueprint. The second behavior blueprint may include only one blueprint node D, and the blueprint node D may by any one of the doorway welcoming skill, the guiding skill, and the beverage offering skill.

The welcoming robot may also include a third behavior blueprint. The third behavior blueprint may include four blueprint nodes E/F/G/H. A preset function corresponding to the blueprint node E may be a meta skill "face recognition", a preset function corresponding to the blueprint node F may be an action skill "shaking hands and extending greetings", a preset function corresponding to the blueprint node G may be an action skill "chatting and conversation", and a preset function corresponding to the blueprint node H may be a behavior skill "guiding skill". A target sequence of the first behavior blueprint is the blueprint node E→the blueprint node F→the blueprint node G→the blueprint node H. In this way, by executing the sequence of the four blueprint nodes, two service tasks of doorway welcoming and seat guidance in a series may be completed.

Optionally, the robot may include a plurality of behavior blueprints and may support nested calls of the behavior blueprints.

For example, the welcoming robot may include the first behavior blueprint, the second behavior blueprint and the third behavior blueprint above at the same time. In an execution process of the first behavior blueprint, the second behavior blueprint may be called, and after executing the second behavior blueprint, the first behavior blueprint may be called again.

In this way, through nested calls of the plurality of behavior blueprints, logically complicated demands of the user may be realized.

In some other examples of the disclosure, the blueprint nodes of the above behavior blueprints support one or more of sequence execution, conditional selection execution and cyclic execution. The three execution manners will be described below respectively: one behavior blueprint above includes a first blueprint node, and one or a plurality of first candidate blueprint nodes connected after the first blueprint node according to a target sequence; and a manner of executing preset functions corresponding to the blueprint nodes according to the target sequence may include one or more or the following three manners:

Sequence execution: after a preset function corresponding to the first blueprint node is executed, if there is one first candidate blueprint node, a preset function corresponding to the first candidate blueprint node is executed.

Selection execution: the behavior blueprint further include a target execution condition according to each first candidate blueprint node; after the preset function corresponding to the first blueprint node is executed, if there are a plurality of first candidate blueprint nodes, a first candidate blueprint node corresponding to satisfying the target execution condition is determined according to an execution result of the first blueprint node and/or a current state of the robot, and the first candidate blueprint node is determined as a second blueprint node; and a preset function corresponding to the second blueprint node is executed.

It needs to be noted that, the target execution condition may include a condition that the execution result of the first blueprint node should satisfy. For example, if the execution result is successful, a third blueprint node is executed; if the execution result fails, a fourth blueprint node is executed. The target execution condition may also include the current state of the robot. For example, if the current state of the robot is a power shortage state, a fifth blueprint node is executed, and a preset function corresponding to the fifth blueprint node may include the meta skill "automatically returning to be charged". The target execution condition may also include the execution result of the first blueprint node and the current state of the robot. For example, if the execution result is successful and the current state of the robot is a normal operation state, the above third blueprint node is executed.

Cyclic execution: in the above sequence execution, if the blueprint node following the first candidate blueprint node is the first blueprint node, after the preset function corresponding to the first candidate blueprint node is executed, the preset function corresponding to the first blueprint node is further executed to form cyclic execution.

In this way, through the above manners, different logical combinations of the plurality of blueprint nodes may be realized, so that the user can complete different task demands based on different scenarios.

In some other examples of the disclosure, in a case of executing a preset function corresponding to a current blueprint node, if a node control instruction input by the user specific to the robot is received, a target blueprint node indicated by the node control instruction is obtained;

after executing the preset function corresponding to the current blueprint node, a preset function corresponding to the target blueprint node is further executed; and preset functions corresponding to blueprint nodes located after the target blueprint node in the welcoming robot are further executed in according to the target.

In this way, the robot may be manually taken over and controlled. Instead of executing according to a pre-designed welcoming robot, manually designated target blueprint nodes may be executed to complete a temporary task designated by the user.

For example, the behavior blueprint of the robot includes five blueprint nodes A-B-C-D-E executed in sequence. When the robot executes a preset function corresponding to the blueprint node B, if the node control instruction input by the user specific to the robot is received, and the target blueprint node indicated by the node control instruction is the blueprint node D, the robot may switch to executing a preset function corresponding to the blueprint node D immediately after executing the blueprint node B, and then continue to execute a preset function corresponding to the blueprint node E in sequence. In another instance, when the robot executes the preset function corresponding to the blueprint node B, if the node control instruction input by the user specific to the robot is received, and the target blueprint node indicated by the node control instruction is the blueprint node A, the robot may switch to executing a preset function corresponding to the blueprint node A immediately after executing the blueprint node B, and then continue to execute preset functions corresponding to the blueprint nodes B-C-D-E in sequence.

In addition, information such as content, receiving time, and execution time of the node control instruction above may also be recorded in a memory of the robot, so that the user can refer to the manual takeover and control behavior.

It needs to be noted that, the node control instruction is used for designating the target blueprint node, but the behavior blueprint will not be modified. Thus, the temporary task may be completed through the manner, and after the temporary manner is completed, the robot may continue to execute according to the preset behavior blueprint.

In some other examples of the disclosure, the behavior blueprint may be generated in advance in the following manner:

first, a blueprint constructing instruction input by the user is obtained.

Figure 3:
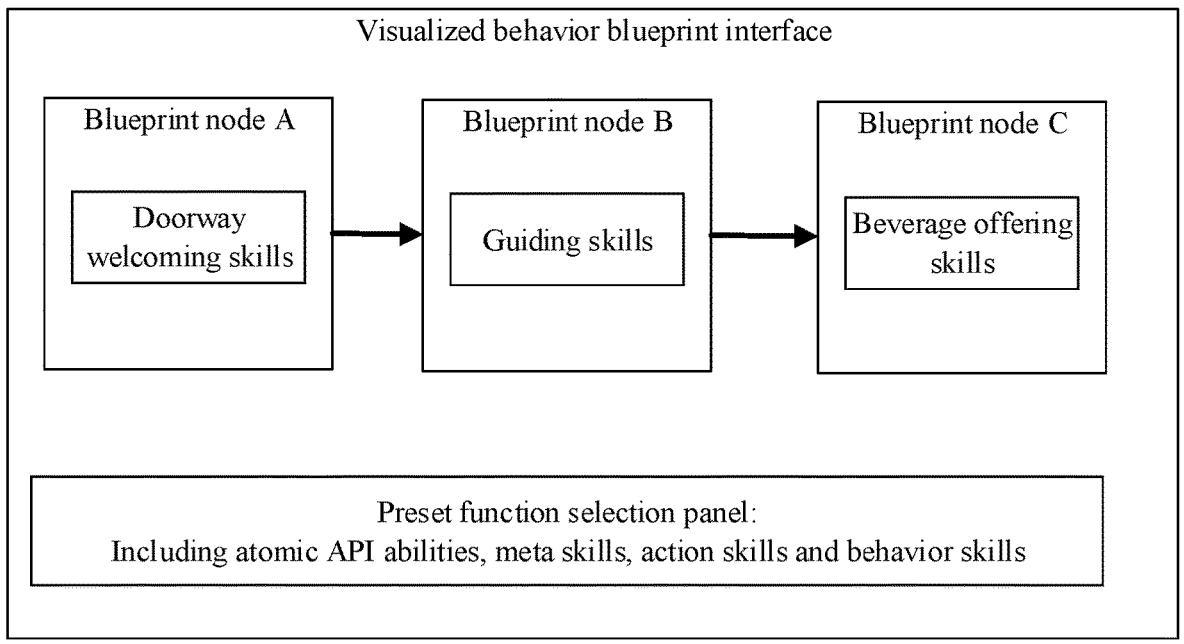
FIG. 3 is a schematic diagram of a visualized behavior blueprint interface provided by an example of the disclosure.

In the step, the blueprint constructing instruction of the user may be input through codes, and may also be input through a visualized interface. FIG. 3 is a visualized behavior blueprint interface provided by an example of the disclosure. Through the visualized behavior blueprint interface, the user may conveniently input the blueprint constructing instruction to realize construction of the behavior blueprint. The visualized behavior blueprint interface includes one or more of preset functions in the preset atomic API abilities, meta skills, action skills and behavior skills of the robot.

The blueprint constructing instruction input by the user may include one or a plurality of node function correspondence relations, each node function correspondence relation includes one blueprint node and a preset function corresponding to the blueprint node, and the preset function may be one or more in the above atomic API abilities, meta skills, action skills and behavior skills selected by the user in the visualized behavior blueprint interface. Of course, the blueprint constructing instruction may include a node connection relation among a plurality of blueprint nodes.

Secondary, the plurality of blueprint nodes are generated according to the node function correspondence relations in the blueprint constructing instruction. The node function correspondence relations include correspondence relations between the blueprint nodes and the preset functions.

Further, a target sequence for connecting the plurality of blueprint nodes is generated according to the node connection relation in the blueprint constructing instruction.

Finally, the plurality of blueprint nodes are connected according to the target sequence to generate the behavior blueprint.

In this way, the user may conveniently construct the behavior blueprint according to the target sequence.

Optionally, the blueprint constructing instruction may further include the first blueprint node, the plurality of first candidate blueprint nodes connected after the first candidate blueprint node according to the target sequence, and the target execution condition corresponding to each first candidate blueprint node. In this way, after the robot executes the preset function corresponding to the first blueprint node, the first candidate blueprint node satisfying the target execution condition may be determined according to the execution result of the first blueprint node and/or the current state of the robot, and the first candidate blueprint node may be determined as the second blueprint node; and the preset function corresponding to the second blueprint node is executed.

Optionally, the user may also construct new meta skills, action skills or behavior skills through the above visualized behavior blueprint interface. For example: the user may select one or a plurality of atomic API abilities to combine into a new meta skill by logic, and name the meta skill, so that the meta skill may be used in constructing the behavior blueprint. Similarly, the user may also select one or more meta skills to combine into a new action skill by logic; or select one or more action skills to combine into a new behavior skill by logic; or select an action skill and a meta skill to combine into a new behavior skill by logic.

In this way, in a case that the preset meta skills, action skills and behavior skills of the robot cannot meet the user's needs, the user may construct the new meta skills, action skills or behavior skills through the visualized behavior blueprint interface, and use the new meta skills, action skills or behavior skills to construct blueprint nodes, thus further constructing a behavior blueprint through the blueprint nodes.

Of course, the user may modify the above meta skills, action skills or behavior skills through the above visualized behavior blueprint interface.

Figure 4:
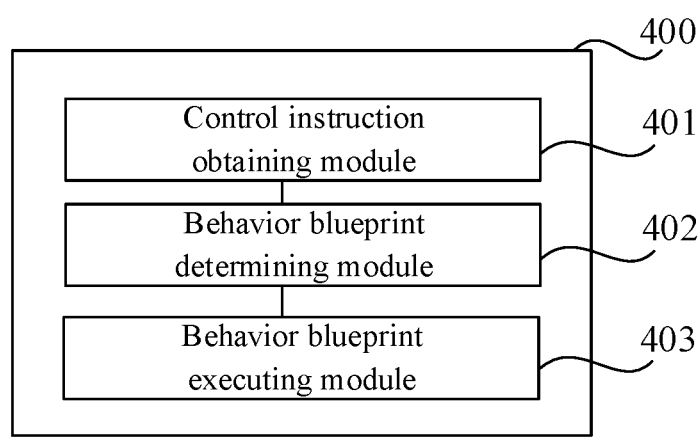
FIG. 4 is a schematic structural diagram of a robot control apparatus provided by an example of the disclosure.

FIG. 4 is a schematic structural diagram of a robot control apparatus provided by an example of the disclosure. As shown in FIG. 4, the robot control apparatus 400 includes:
  a control instruction obtaining module 401, configured to obtain a first control instruction of a robot;
  a behavior blueprint determining module 402, configured to determine a behavior blueprint corresponding to the first control instruction, the behavior blueprint includes a plurality of blueprint nodes connected according to a target sequence; and
  a behavior blueprint executing module 403, configured to execute preset functions corresponding to blueprint nodes according to a target sequence.

The preset functions corresponding to the blueprint nodes include an atomic API ability, a meta skill and a task skill. The atomic API ability is used for characterizing a specific function executed by the robot through a component, the meta skill is used for characterizing a function of an execution unit of the robot, the task skill is used for characterizing a function of user-oriented execution of a target task by the robot, the robot includes one or a plurality of execution units, and each execution unit includes one or a plurality of components.

Optionally, the task skill includes an action skill and a behavior skill; the behavior skill includes one or a plurality of action skills; each action skill includes one or a plurality of meta skills; and each meta skill includes one or a plurality of atomic API abilities.

Optionally, the behavior blueprint includes a first blueprint node and one or a plurality of first candidate blueprint nodes connected after the first blueprint node according to the target sequence;

The behavior blueprint executing module 403 is configured to execute, if there is one first candidate blueprint node, a preset function corresponding to the first candidate blueprint node after executing a preset function corresponding to a first blueprint node.

Optionally, the behavior blueprint further includes a target execution condition corresponding to each first candidate blueprint node;

The behavior blueprint executing module 403 is further configured to determine, if there are a plurality of first candidate blueprint nodes, a first candidate blueprint node corresponding to satisfying a target execution condition according to an execution result of the first blueprint node and/or a current state of a robot after executing a preset function corresponding to the first blueprint node, and determine the first candidate blueprint node as a second blueprint node; and execute a preset function corresponding to the second blueprint node.

Figure 5:
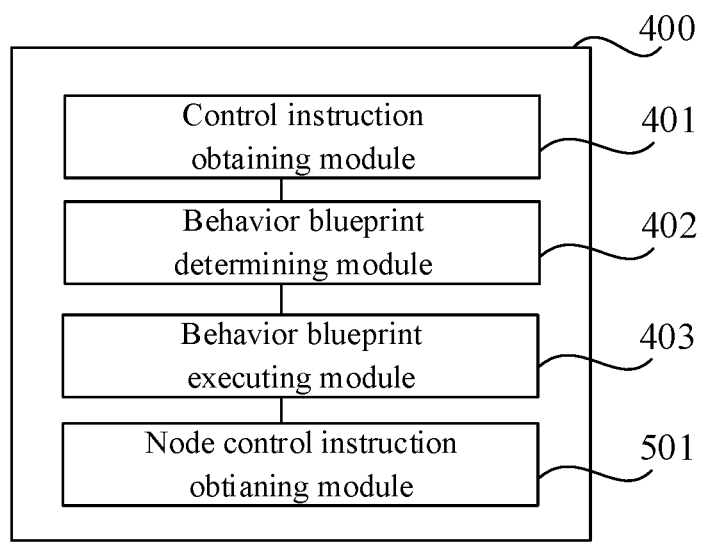
FIG. 5 is a schematic structural diagram of another robot control apparatus provided by an example of the disclosure.

FIG. 5 is a schematic structural diagram of another robot control apparatus provided by an example of the disclosure. As shown in FIG. 5, the robot control apparatus 400 further includes:
  a node control instruction obtaining module 501, configured to obtain, if receiving a node control instruction input by a user specific to the robot, a target blueprint node indicated by the node control instruction in a case of executing a preset function corresponding to a current blueprint node; and
  the behavior blueprint executing module 403 is configured to continue to execute a preset function corresponding to the target blueprint node after executing the preset function corresponding to the current blueprint node; and continue to execute a preset function corresponding to a blueprint node located after the target blueprint node in the behavior blueprint according to the sequence.

Figure 6:
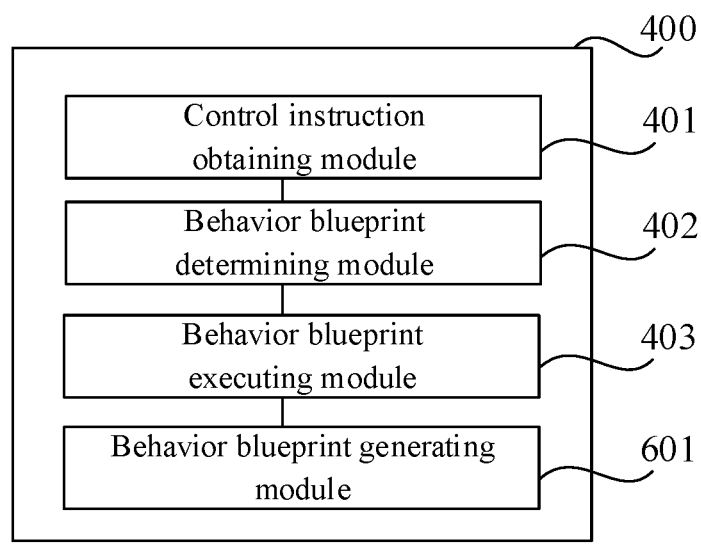
FIG. 6 is a schematic structural diagram of further another robot control apparatus provided by an example of the disclosure.

FIG. 6 is a schematic structural diagram of further another robot control apparatus provided by an example of the disclosure. As shown in FIG. 6, the robot control apparatus 400 further includes:
  a behavior blueprint generating module 601, configured to generate the behavior blueprint in advance in the following manners:
  a blueprint constructing instruction input by the user is obtained; the plurality of blueprint nodes are generated according to a node function correspondence relation in the blueprint constructing instruction, and the node function correspondence relation includes correspondence relations between the blueprint nodes and the preset functions; the target sequence for connecting the plurality of blueprint nodes is generated according to a node connection relation in the blueprint constructing instruction; and the plurality of blueprint nodes are connected according to the target sequence to generate the behavior blueprint.

With regard to the apparatus in the above examples, specific manners of executing operations by the modules have been described in detail in the examples concerning the method, and detailed description will not be made here.

Figure 7:
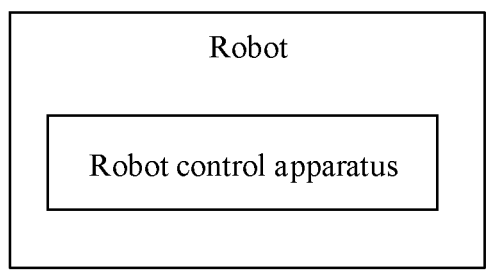
FIG. 7 is a block diagram of a robot provided by an example of the disclosure.

FIG. 7 is a block diagram of a robot provided by an example of the disclosure. As shown in FIG. 7, the robot includes any one of the robot control apparatuses provided in the above examples.

Figure 8:
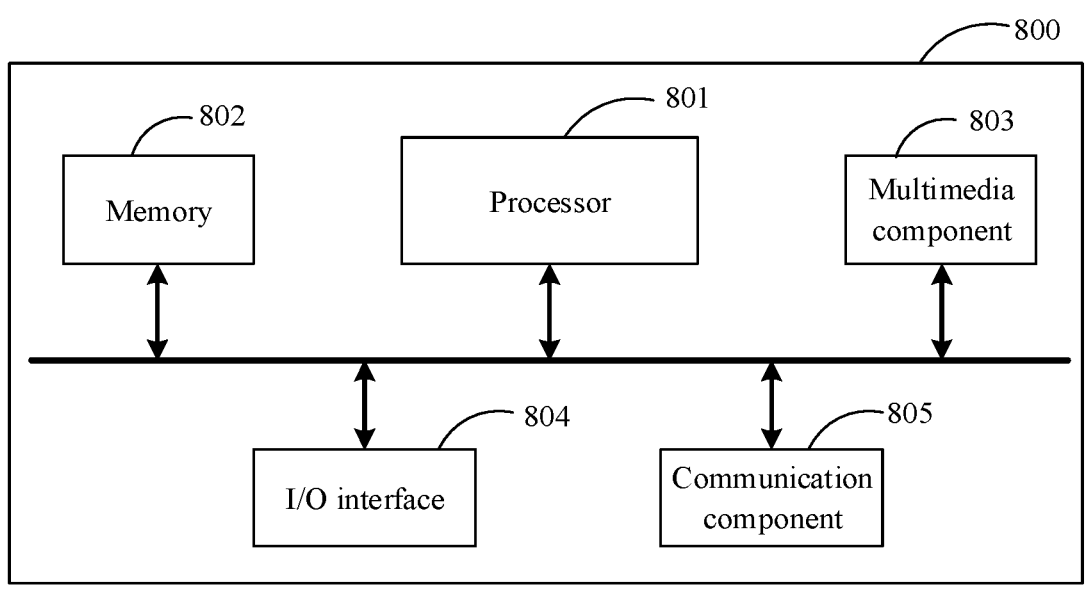
FIG. 8 is a block diagram of an electronic device provided by an example of the disclosure.

FIG. 8 is a block diagram of an electronic device 800 illustrated according to an example. As shown in FIG. 8, the electronic device 800 may include: a processor 801, and a memory 802. The electronic device 800 may further include one or more of a multimedia component 803, an input/output (I/O) interface 804, and a communication component 805.

The processor 801 is configured to control overall operations of the electronic device 800 so as to complete all or part of steps in the above robot control method. The memory 802 is configured to store various types of data to support the operations on the electronic device 800. These data may include, for example, instructions for any application program or method operated on the electronic device 800, as well as data related to application programs, such as contact data, messages sent and received, pictures, audio, video, etc. The memory 802 may be realized by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The multimedia component 803 may include a screen and an audio component. The screen may be a touch screen, for example, and the audio component is configured to output and/or input audio signals. For example, the audio component may include a microphone, which is configured to receive external audio signals. The received audio signals may be further stored in the memory 802 or sent through the communication component 805. The audio component also includes at least one loudspeaker for outputting audio signals. The I/O interface 804 provides an interface between the processor 801 and other interface modules. The above-mentioned other interface modules may be a keyboard, a mouse, buttons, and the like. These buttons may be virtual buttons or physical buttons. The communication component 805 is configured to perform wired or wireless communication between the electronic device 800 and other devices. Wireless communication includes, for example, Wi-Fi, Bluetooth, near field communication (NFC), 2G, 3G, 4G, NB-IOT, eMTC, or other 5G, etc., or one or more of combinations of them, which is not limited here. Thus, the corresponding communication component 805 may include: a Wi-Fi module, a Bluetooth module, an NFC module, and so on.

In an example, the electronic device 800 may be realized by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, so as to execute the above-mentioned robot control method.

In another example, a computer readable storage medium including program instructions is further provided. The program instructions realize steps of the above robot control method when being executed by a processor. For example, the computer readable storage medium may be the above memory 802 including program instructions, and the program instructions may be executed by the processor 801 of the electronic device 800 to complete the above robot control method.

Figure 9:
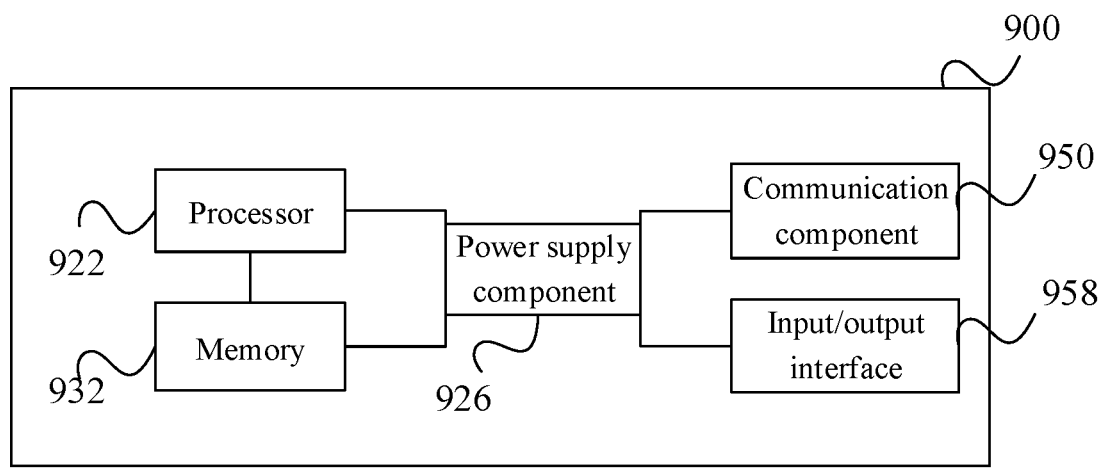
FIG. 9 is a block diagram of another electronic device provided by an example of the disclosure.

FIG. 9 is a block diagram of an electronic device 900 illustrated according to an example. For example, the electronic device 900 may be provided as a server. With reference to FIG. 9, the electronic device 900 includes one or a plurality of processors 922 and a memory 932 which is configured to store computer programs executable by the processors 922. The computer programs stored in the memory 932 may include one or more modules each corresponding to one set of instructions. In addition, the processors 922 may be configured to execute the computer programs to execute the above robot control method.

In addition, the electronic device 900 may further include a power supply component 926 and a communication component 950. The power supply component 926 may be configured to execute power management of the electronic device 900, and the communication component 950 may be configured to realize communication of the electronic device 900, for example, wired or wireless communication. In addition, the electronic device 900 may further include an input/output (I/O) interface 958. The electronic device 900 may operate an operating system stored in the memory 932, such as Windows Server, Mac OS, Unix, Linux, and so on.

In another example, a computer readable storage medium including program instructions is further provided. The program instructions realize steps of the above robot control method when being executed by a processor. For example, the computer readable storage medium may be the above memory 932 including program instructions, and the program instructions may be executed by the processor 932 of the electronic device 900 to complete the above robot control method.

In another example, a computer program product is further provided. The computer program product contains a computer program that can be executed by a programmable apparatus. The computer program has a code part which is configured to execute the above robot control method when being executed by the programmable apparatus.

The preferred examples of the disclosure are described in detail above with reference to the accompanying drawings. However, the disclosure is not limited to the specific details in the foregoing examples. Within the scope of the technical concept of the disclosure, various simple modifications can be made to the technical solutions of the disclosure, and these simple modifications all belong to the protection scope of the disclosure.

In addition, it should be noted that the various specific technical features described in the above-mentioned specific implementations can be combined in any suitable manner, provided that there is no contradiction. In order to avoid unnecessary repetition, various possible combinations are not described separately in the disclosure.

In addition, various different examples of the disclosure can also be combined arbitrarily, and as long as they do not violate the concept of the disclosure, they should also be regarded as the content disclosed in the disclosure.

What is claimed is:

1. A robot control method, wherein the method comprises:
obtaining a first control instruction of a robot;
determining a behavior blueprint corresponding to the first control instruction, wherein the behavior blueprint comprises a plurality of blueprint nodes connected according to a target sequence; and
executing preset functions corresponding to the blueprint nodes according to the target sequence; wherein
the preset functions corresponding to the blueprint nodes comprise an atomic API ability, a meta skill and a task skill, wherein the atomic API ability is used for characterizing a specific function executed by the robot through a component, the meta skill is used for characterizing a function of an execution unit of the robot, the task skill is used for characterizing a function of user-oriented execution of a target task by the robot, the robot comprises one or a plurality of execution units, and each execution unit comprises one or a plurality of components;
wherein the task skill comprises a behavior skill; the behavior skill comprises one or a plurality of action skills; each action skill comprises one or a plurality of the meta skills; and each meta skill comprises one or a plurality of the atomic API abilities;
wherein there are a plurality of the behavior blueprints, and the method further comprises: performing nested calls of the plurality of the behavior blueprints.

2. The method according to claim 1, wherein the behavior blueprint comprises a first blueprint node and one or a plurality of first candidate blueprint nodes connected after the first blueprint node according to the target sequence; and the executing the preset functions corresponding to the blueprint nodes according to the target sequence comprises:
executing, if there is one first candidate blueprint node, a preset function corresponding to the first candidate blueprint node after executing a preset function corresponding to the first blueprint node.

3. The method according to claim 2, wherein the behavior blueprint further comprises a target execution condition corresponding to each first candidate blueprint node, and the executing the preset functions corresponding to the blueprint nodes according to the target sequence comprises:
determining, if there are a plurality of the first candidate blueprint nodes, a first candidate blueprint node corresponding to satisfying the target execution condition according to an execution result of the first blueprint node and/or a current state of the robot after executing the preset function corresponding to the first blueprint node, and determining the first candidate blueprint node as a second blueprint node; and
executing a preset function corresponding to the second blueprint node.

4. The method according to claim 1, wherein the method further comprises:
obtaining, if receiving a node control instruction input by a user specific to the robot, a target blueprint node indicated by the node control instruction in a case of executing a preset function corresponding to a current blueprint node;
continuing to execute a preset function corresponding to the target blueprint node after executing the preset function corresponding to the current blueprint node; and
continuing to execute a preset function corresponding to a blueprint node located after the target blueprint node in the behavior blueprint according to the sequence.

5. The method according to claim 1, wherein the behavior blueprint is generated in advance in the following manner:
obtaining a blueprint constructing instruction input by a user;
generating the plurality of blueprint nodes according to a node function correspondence relation in the blueprint constructing instruction, wherein the node function correspondence relation comprises correspondence relations between the blueprint nodes and the preset functions;
generating the target sequence for connecting the plurality of blueprint nodes according to a node connection relation in the blueprint constructing instruction; and
connecting the plurality of blueprint nodes according to the target sequence to generate the behavior blueprint.

6. A non-transitory computer readable storage medium, storing a computer program thereupon, when the computer program in the non-transitory computer readable storage medium is executed by a processor, the processor is caused to:
obtain a first control instruction of a robot;
determine a behavior blueprint corresponding to the first control instruction, wherein the behavior blueprint comprises a plurality of blueprint nodes connected according to a target sequence; and
execute preset functions corresponding to the blueprint nodes according to the target sequence; wherein
the preset functions corresponding to the blueprint nodes comprise an atomic API ability, a meta skill and a task skill, wherein the atomic API ability is used for characterizing a specific function executed by the robot through a component, the meta skill is used for characterizing a function of an execution unit of the robot, the task skill is used for characterizing a function of user-oriented execution of a target task by the robot, the robot comprises one or a plurality of execution units, and each execution unit comprises one or a plurality of components;
wherein the task skill comprises a behavior skill; the behavior skill comprises one or a plurality of action skills; each action skill comprises one or a plurality of the meta skills; and each meta skill comprises one or a plurality of the atomic API abilities;
wherein there are a plurality of the behavior blueprints, and the processor is further configured to perform nested calls of the plurality of the behavior blueprints.

7. The non-transitory computer readable storage medium according to claim 6, wherein the behavior blueprint comprises a first blueprint node and one or a plurality of first candidate blueprint nodes connected after the first blueprint node according to the target sequence; and when the computer program in the non-transitory computer readable storage medium is executed by the processor, the processor is further caused to:
execute, if there is one first candidate blueprint node, a preset function corresponding to the first candidate blueprint node after executing a preset function corresponding to the first blueprint node.

8. The non-transitory computer readable storage medium according to claim 7, wherein the behavior blueprint comprises a target execution condition corresponding to each first candidate blueprint node; and when the computer program in the non-transitory computer readable storage medium is executed by the processor, the processor is further caused to:
determine, if there are a plurality of the first candidate blueprint nodes, a first candidate blueprint node corresponding to satisfying the target execution condition according to an execution result of the first blueprint node and/or a current state of the robot after executing the preset function corresponding to the first blueprint node, and determining the first candidate blueprint node as a second blueprint node; and
execute a preset function corresponding to the second blueprint node.

9. The non-transitory computer readable storage medium according to claim 6, when the computer program in the non-transitory computer readable storage medium is executed by the processor, the processor is further caused to:
obtain, if receiving a node control instruction input by a user specific to the robot, a target blueprint node indicated by the node control instruction in a case of executing a preset function corresponding to a current blueprint node;
continue to execute a preset function corresponding to the target blueprint node after executing the preset function corresponding to the current blueprint node; and
continue to execute a preset function corresponding to a blueprint node located after the target blueprint node in the behavior blueprint according to the sequence.

10. The non-transitory computer readable storage medium according to claim 6, when the computer program in the non-transitory computer readable storage medium is executed by the processor, the processor is further caused to:
obtain a blueprint constructing instruction input by a user;
generate the plurality of blueprint nodes according to a node function correspondence relation in the blueprint constructing instruction, wherein the node function correspondence relation comprises correspondence relations between the blueprint nodes and the preset functions;
generate the target sequence for connecting the plurality of blueprint nodes according to a node connection relation in the blueprint constructing instruction; and
connect the plurality of blueprint nodes according to the target sequence to generate the behavior blueprint.

11. An electronic device, comprising:
a memory, storing a computer program thereupon; and
a processor, configured to execute the computer program in the memory so as to:
obtain a first control instruction of a robot;
determine a behavior blueprint corresponding to the first control instruction, wherein the behavior blueprint comprises a plurality of blueprint nodes connected according to a target sequence; and
execute preset functions corresponding to the blueprint nodes according to the target sequence; wherein the preset functions corresponding to the blueprint nodes comprise an atomic API ability, a meta skill and a task skill, wherein the atomic API ability is used for characterizing a specific function executed by the robot through a component, the meta skill is used for characterizing a function of an execution unit of the robot, the task skill is used for characterizing a function of user-oriented execution of a target task by the robot, the robot comprises one or a plurality of execution units, and each execution unit comprises one or a plurality of components;

wherein the task skill comprises a behavior skill; the behavior skill comprises one or a plurality of action skills; each action skill comprises one or a plurality of the meta skills; and each meta skill comprises one or a plurality of the atomic API abilities;

wherein there are a plurality of the behavior blueprints, and the processor is further configured to perform nested calls of the plurality of the behavior blueprints.

12. The electronic device according to claim 11, wherein the behavior blueprint comprises a first blueprint node and one or a plurality of first candidate blueprint nodes connected after the first blueprint node according to the target sequence; and the processor is further configured to:

execute, if there is one first candidate blueprint node, a preset function corresponding to the first candidate blueprint node after executing a preset function corresponding to the first blueprint node.

13. The electronic device according to claim 12, wherein the behavior blueprint further comprises a target execution condition corresponding to each first candidate blueprint node; and the processor is further configured to:

determine, if there are a plurality of the first candidate blueprint nodes, a first candidate blueprint node corresponding to satisfying the target execution condition according to an execution result of the first blueprint node and/or a current state of the robot after executing the preset function corresponding to the first blueprint node, and determining the first candidate blueprint node as a second blueprint node; and execute a preset function corresponding to the second blueprint node.

14. The electronic device according to claim 11, wherein the processor is further configured to:

obtain, if receiving a node control instruction input by a user specific to the robot, a target blueprint node indicated by the node control instruction in a case of executing a preset function corresponding to a current blueprint node;

continue to execute a preset function corresponding to the target blueprint node after executing the preset function corresponding to the current blueprint node; and continue to execute a preset function corresponding to a blueprint node located after the target blueprint node in the behavior blueprint according to the sequence.

15. The electronic device according to claim 11, wherein the processor is further configured to:

obtain a blueprint constructing instruction input by a user;

generate the plurality of blueprint nodes according to a node function correspondence relation in the blueprint constructing instruction, wherein the node function correspondence relation comprises correspondence relations between the blueprint nodes and the preset functions;

generate the target sequence for connecting the plurality of blueprint nodes according to a node connection relation in the blueprint constructing instruction; and connect the plurality of blueprint nodes according to the target sequence to generate the behavior blueprint.

* * * * *